United States Patent

Kyser

[15] 3,659,274

[45] Apr. 25, 1972

[54] FLOW-THROUGH SHIFTER

[72] Inventor: Leslie T. Kyser, Binghamton, N.Y.

[73] Assignee: The Singer Company, New York, N.Y.

[22] Filed: July 28, 1970

[21] Appl. No.: 58,955

[52] U.S. Cl. ........ 340/172.5

[51] Int. Cl. ........ G06f 7/00

[58] Field of Search ........ 340/172.5

[56] References Cited

UNITED STATES PATENTS

| | | | |
|---|---|---|---|
| 3,076,181 | 1/1963 | Newhouse et al. | 340/172.5 X |
| 3,214,738 | 10/1965 | Parrott, Jr. | 340/172.5 |
| 3,274,555 | 9/1966 | Luke | 340/172.5 |
| 3,374,463 | 3/1968 | Muir | 340/172.5 |
| 3,374,468 | 3/1968 | Muir | 340/172.5 |
| 3,395,396 | 7/1968 | Pasternak | 340/172.5 |

*Primary Examiner*—Raulfe B. Zache
*Attorney*—Francis L. Masselle, William Grobman and Charles S. McGuire

[57] ABSTRACT

This specification describes a flow-through shifter which is very simple and selectively shifts input digital data a prescribed number of spaces to the right in response to a value represented in a binary control word. The shifter provides a plurality of switching gates which are cascaded. A separate bank of gates is provided for each digit position of the control word, and the banks are cascaded such that the outputs from one bank are applied to the inputs of gates which are to the right of that digit position. Each gate is provided with two output paths. One of these paths moves the information the prescribed number of spaces to the right, and the other of these paths transmits information in the same position in which it is received.

7 Claims, 1 Drawing Figure

PATENTED APR 25 1972 3,659,274
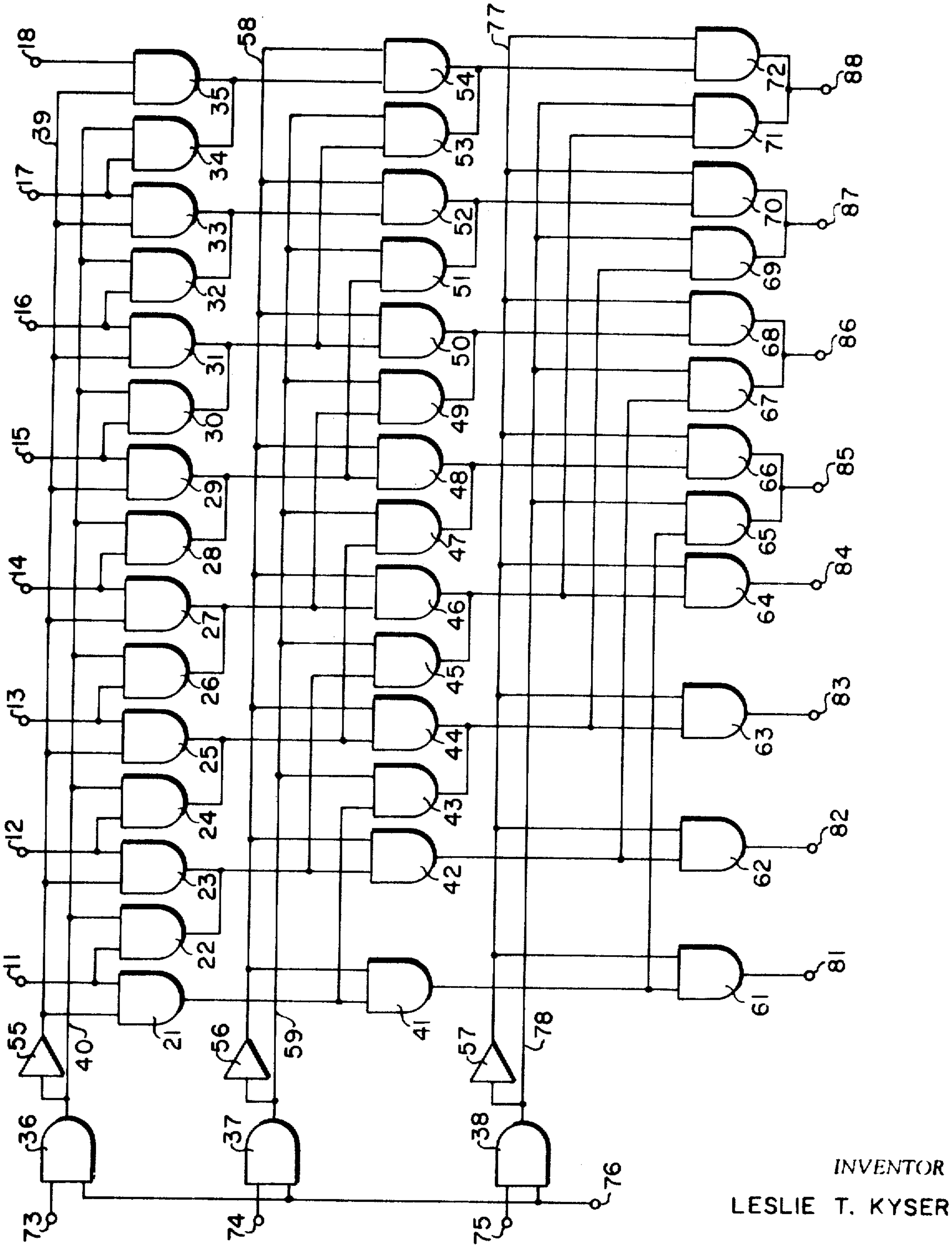
INVENTOR
LESLIE T. KYSER
BY *William Grobman*
ATTORNEY

FLOW-THROUGH SHIFTER

This invention relates to digital data handling apparatus, and more particularly to apparatus for shifting the position of digital data.

One of the operations performed by digital computers is the shifting of digital information a prescribed number of spaces to the right or to the left. Each shift of information one digit position to the right is the same as dividing that information by the radix of the system, and each shift of the information one digit position to the left is the same as multiplying that information by the radix of the system. Thus, it can be seen that shifting of information during its processing is a very valuable and effective tool. In the past, various means for shifting digital data were used. Probably the most common type of device is the shift register which may be only as long as the word used. Information is inserted in one end of the register, and, in response to recurring pulses, the information is gradually stepped from one end of the register to the other. A shift register can be a fairly complex piece of equipment, but undoubtly, what is a greater disadvantage to the use of shift registers is the large amount of time they require to receive and shift information. Each shift occupies a minor cycle of a synchronous machine, so that even using registers in which information can be inserted in parallel to fill the register at one time, shifting that information any number of spaces requires a substantial amount of time. Where information is stored in circulating registers, which could include magnetic disks and drums, information can be shifted by taking it out at an earlier or later time than zero time. If the normal reading head is in a given position and reads out information as the information sweeps past the head, right shift information can be read from a later position and left shift information can be read from an earlier position of the head. However, this requires additional equipment, and is expensive to construct and maintain, and may be difficult to operate. One of the improvements constantly being made in digital computers is the overall speed in operation. Since both of the above described types of shifters operate in serial fashion, neither contributes to increased speed of operation of a computer. This is often a disadvantage where increased speed of operation is desired.

It is an object of this invention to provide a new and improved device for shifting digital information.

It is another object of this invention to provide a new and improved device for rapidly shifting digital information.

It is a further object of this invention to provide a new and improved device for rapidly and automatically (asynchronously) shifting digital information a plurality of spaces in the presence of only a single control signal.

Additional objects and advantages of this invention will become apparent as the following description proceeds, which description should be considered together with the accompanying drawing in which the single FIGURE is a block diagram of the device of this invention.

Referring now to the drawing in detail, the binary word to be shifted is applied to the input terminals 11, 12, 13, 14, 15, 16, 17, and 18, with an individual bit being applied to each of these terminals. The terminals 11–17 are individually connected to the inputs of pairs of gates 21, 22, 23, 24, 25, 26, 27, 28, 29, 30, 31, 32, 33, and 34. The terminal 11 is connected to the inputs of gates 21 and 22, terminal 12 is connected to the inputs of gates 23 and 24, terminal 13 is connected to the inputs of gates 25 and 26, terminal 14 is connected to the inputs of gates 27 and 28, terminal 15 is connected to the inputs of gates 29 and 30, terminal 16 is connected to the inputs of gates 31 and 32, and terminal 17 is connected to the inputs of gates 33 and 34. Input terminal 18 is connected to the input of gate 35. The outputs of the gates 22–35 are connected together in pairs with each pair of outputs being connected to the inputs of a second bank of gates 41, 42, 43, 44, 45, 46, 47, 48, 49, 50, 51, 52, 53, and 54. The output of the gate 21 is connected to the input of gate 41 and to the input of gate 43. The outputs of gates 22 and 23 are connected together and to the inputs of gates 42 and 45. The outputs of gates 24 and 25 are connected together and to the inputs of gates 44 and 47. The outputs of gates 26 and 27 are connected together and to the inputs of gates 46 and 49. The outputs of gates 28 and 29 are connected together and to the inputs of gates 48 and 51. The outputs of gates 30 and 31 are connected together and to the inputs of gates 50 and 53. The outputs of gates 32 and 33 are connected together and to the input of gate 52, and the outputs of gates 34 and 35 are connected together and to the input of gate 54. In a similar manner the outputs of the gates 41–54 in the second row of gates are connected together in pairs and provide inputs for gates in a third row of gates comprising 61, 62, 63, 64, 65, 66, 67, 68, 69, 70, 71, and 72. The output of gate 41 is connected to the inputs of gates 61 and 65. The output of gate 42 is connected to the inputs of gates 62 and 67. The outputs of gates 43 and 44 are connected together and to the inputs of gates 63 and 69. The outputs of gates 45 and 46 are connected together and to the inputs of gates 64 and 71. The outputs of gates 47 and 48 are connected together and to the input of gate 66. The outputs of gates 49 and 50 are connected together and to the input of gate 68. The outputs of gates 51 and 52 are connected together and to the input of gate 70, and the outputs of gates 53 and 54 are connected together and to the input of gate 72. The output of gate 61 is connected to an output terminal 81, the output of gate 62 is connected to an output terminal 82, the output of gate 63 is connected to an output terminal 83, and the output of gate 64 is connected to the output terminal 84. The outputs of gates 65 and 66 are connected together and to an output terminal 85, and the outputs of gates 67 and 68 are connected together and to an output terminal 86. In a similar manner, the outputs from the gates 69 and 70 are together connected to an output terminal 87, and the outputs of the gates 71 and 72 are together connected to the output terminal 88.

So far, this description has set forth one input to each gate in the three rows of gates 21–35, 41–54, and 61–72. Each gate has a second input. A binary word defining the number of spaces the data word is to be shifted is applied to the input terminals 73, 74, and 75 with the least significant digit applied to terminal 73 and the most significant digit applied to terminal 75. Terminal 73 is connected to one input of gate 36 whose output is connected directly to a line 40 and through an inverter 55 to a line 39. The odd numbered gates in the first row of gates 21–35 (gates 21, 23, 25, 27, 29, 31, 33, and 35) have their second inputs connected to the inverted line 39, and the even numbered gates (22, 24, 26, 28, 30, 32, and 34) have a second input connected to the direct line 40. The terminal 74 is connected to one input of gate 37 whose output is directly connected to a line 59 and through a inverter 56 to a line 58. In the second row of gates, gate 41 and the even numbered gates (42, 44, 46, 48, 50, 52, and 54) have their second inputs connected to the inverted line 58, and the other add gates (43, 45, 47, 49, 51, and 53) have their second inputs connected to the direct line 59. The terminal 75 is connected to one input of the gate 38 whose output is directly connected to line 78 and through an inverter 57 to a line 77. In the third row of gates, gates 61, 62, 63, 64, 66, 68, 70, and 72 have their second inputs connected to the inverted line 77, and the gates 65, 67, 69, and 71 have their second inputs connected to the direct line 78. The second inputs to the gates 36, 37, and 38 are connected to a switching input terminal 76. This terminal represents the single gating signal with gates the three-bit binary control word (shift amount) into the shifter.

In operation, the shifter of this invention is designed simultaneously to shift the word the prescribed number of spaces in a single operation. In the system shown in the figure a word having eight bits can be shifted up to seven spaces to the right. This range is, of course, only exemplary, and any larger or smaller words and shifts may be accomplished with the device of this invention. To accomplish this, the word to be shifted is applied to the input terminals 11–18 with each digit of that word being applied to a separate input terminal. A three-digit binary word which indicates the number of spaces the information word is to be shifted is applied to the input terminals 73, 74, and 75. Assume that the information word is to be shifted five spaces. A 1 will be applied to the terminal 73, a 0 to the terminal 74, and a 1 to the terminal 75. A gating or switching signal is applied to input terminal 76, and the gates 36 and 38 will open to pass signals. Since the outputs of gates 36 and 38 are 1s, the lines 40 and 78 contain the energizing information. Since the output of the gate 37 is a 0, the line 58 contains the energizing information because line 58 is connected to the output of the gate 57 through the inverter 56. Consider first the row of gates 21–35. Those gates which are connected to line 40 and have 1s applied to them form the terminals 11–18 will pass output information. All other outputs from these gates will be 0. The even numbered gates 22, 24, 26, 28, 30, 32, and 34 are connected to the line 40 and these are the only gates which are open. It should be noted that the even numbered gates 22–34 have their outputs connected to a lower order gate in the second row of gates. If it is assumed that the odd input terminals 11, 13, 15, and 17 have 1's applied to them and that the other input terminals have 0's applied to them, then, in the case selected, gates 22, 26, 30, and 34 are open and will pass 1's to the next bank of gates. Since a 0 was applied to input terminal 74, line 58 is energized and gates 41, 42, and the even numbered gates 44–54 have energizing signals applied to them. The output of gate 22 causes gate 42 to open, the output of gate 26 causes gate 46 to open, the output of gate 30 causes gate 50 to open, and the output of gate 34 causes gate 54 to open. In this case, the signal received from the first bank of gates 21–35 is passed on to the third bank of gates in the same number position it was received. In other words, the first bank of gates 21–35 shifted the information word one space to the right, but the second bank of gates 41–54 does not shift the information at all. A "1" was applied to input terminal 75 so that line 78 was energized and the odd numbered gates 65, 67, 69, and 71 are connected thereto. The output for gate 42 causes gate 67 to pass a 1 to output terminal 86. The output from gate 46 causes the gate 71 to pass a 1 to output terminal 88. All other gates pass 0's. It should be noted that of the two possible paths that the output of the gate 42 could take (through the gate 62 or through the gate 67) the gate 62 was closed because it was not connected to the energized line 78, but the gate 67 was opened. Thus, the third row of gates 61–72 has shifted the information word four spaces to the right to give a total shift of five spaces to the right. As in all shifters those digits shifted out past the capacity of the shifter are lost, and 0's fill the empty spaces to the left.

The system of the figure is designed to shift the information word by each row of gates the number of spaces represented by the particular digit of the shift word which controls that row of gates. Thus, in the binary system of the figure the digit applied to the terminal 73 represents a one-bit shift, that applied to the terminal 74 represents a two-bit shift, and that applied to terminal 75 represents a four-bit shift. When a 1 is applied to terminal 73, the first row of gates 21–35 shifts the information word one space to the right. When a 1 is applied to input terminal 74, the second row of gates 41–54 shifts the information word two spaces to the right, and when a 1 is applied to input terminal 75, the third row of gates 61–72 shifts the information word four spaces to the right. Each row of gates provides a pair of gates for each digit so that one gate can pass the digit without shifting and the other gate passes the digit while shifting it the prescribed number of spaces. Which gate is opened depends upon the value of the digit applied to the input terminals 73, 74, or 75. In this manner each row of gates can either pass the information word without shifting or can pass it shifting the prescribed number of spaces. The entire system is designed so that information flows through it in a single operation. Gates 36, 37, and 38 and input terminal 76 are provided to prevent any shifting at all when the circuit of the figure is used as a static device in a series path, i.e. simply deactivating input signal 76 eliminates all shifting.

The above specification has described a digital shifter which will selectively shift binary words a prescribed number of spaces rapidly and in one operation. The particular embodiment described accepts words of eight binary bits which can be shifted up to seven-bit positions to the right. In the embodiment shown in the figure and described above, a three-digit control word was used. However, the apparatus of the figure can be expanded merely by duplicating the parts to accept any length information word and any size control word. Basically, the device of this invention is a switching device which switches the digits of the information word through paths which are selected by the control word. Although the operation of the device is such that information flows through it, the switching takes place in several stages, one for each digit of the control word. The distance or amount that the information word is shifted at each stage depends upon the value of the control digit at that stage. Although the embodiment shown and described shifts information to the right only, the same principles will provide a shifter which will shift information to the left, and a slightly more complex shifter will shift information to either the left or the right depending upon the sign of the control number. The last embodiment can operate the same as the device of the figure where gates are provided for shifting the information word to the left as well as those gates which shift the information word to the right. The selection of the right or left shift can be made using a second group of gates similar to gates 36, 37, and 38 with the selection of one set of gates or the other being determined by the sign of the input signal on a terminal similar to terminal 76. It is realized that the above specification will indicate to those skilled in the art other ways in which the principles of this invention may be utilized without departing from its spirit. It is, therefore, intended that this invention be limited only by the scope of the appended claims.

What is claimed is:

1. A flow-through shifter for digital words, said shifter comprising a plurality of rows of switching devices, each row comprising a digit position corresponding to the position of one of the digits to be shifted, each digit position comprising a pair of switching devices, means for connecting said rows in cascade with the output from the switching devices in one row being connected to the inputs of switching devices in the next row, said connecting means including means for connecting the output of one of the switching devices of each pair at one digit position to the input of the switching device of the same digit position in the next row and means for connecting the output of the other switching device of each pair to the input of a switching device of a different digit position in the next row, all of the other switching devices of one row having their outputs connected to the inputs of switching devices in the next row which are displaced therefrom by the same number of digit positions, means for applying the digits to be shifted to the first row of switching devices, and means connected to said switching devices for selecting which switching device of each pair in each row is opened to pass each digit.

2. A flow-through shifter for shifting digital words selected amounts, said shifter comprising a plurality of rows of gates, each of which gate has more than one input and an output, each row of gates comprising one digit position for each digit of the word to be shifted, means for applying each digit of the word to be shifted to a digit position of the first row of gates, said first row of gates comprising two gates for each digit position, means for connecting the outputs from one gate of each digit position of said first row of gates to the inputs of gates in the next row of gates which are in the same digit position, means for connecting the outputs from the other gate in the first row of gates to the inputs of gates in the next row of gates which are a prescribed number of digit positions displaced from the first row digit positions, and means for selecting which gate of said first row will be opened.

3. The shifter defined in claim 2 further including additional rows of gates, each of which additional rows comprises a digit position for each digit of the word being shifted, means for connecting the output from one gate in each digit position to the input of the gate in the same digit position in the next row of gates, means for connecting the output from another gate in each digit position to the input of a gate in a digit position spaced a prescribed number of digit positions away in the next row, and means for selecting which of the gates in additional each row of gates is opened to pass the digit applied thereto.

4. The shifter defined in claim 3 wherein said selection means comprises a pair of input control lines for each row of gates, means for connecting one gate of each digit position in the row to one of said control lines, means for connecting the other gate of each digit position to the other control line, and means for selectively energizing the desired control line.

5. Apparatus for shifting digital words a selected number of digit positions, said apparatus comprising a plurality of rows of switching means, each row having a switching means for each digit position for passing input information to the next row in the same digit position, each row having a switching means for each digit position for passing input information to the next row a prescribed number of digit positions displaced therefrom, and means for each row for selecting which switching means is to pass the input information applied thereto to determine the total number of digits the word is shifted.

6. The apparatus defined in claim 5 wherein said switching means comprises gates having at least an information input, a control input, and an output, said information input being connected to the output of the gate of the previous row and said control input being connected to said means for selecting.

7. The apparatus defined in claim 6 wherein said selecting means comprises a pair of control lines for each row, one of said control lines being connected to the control inputs of all of the gates which pass information in the same digit positions and the other control line being connected to the other gates, and means for selectively energizing one or the other of the control lines for each row to determine which rows pass information to the next row in the same digit positions and which rows pass information to the next row in shifted digit positions.

* * * * *